United States Patent Office 2,745,816
Patented May 15, 1956

2,745,816

NOVOLAK FROM PHENOL AND FURFURAL REACTED IN ALKALINE MEDIUM

Rinse Dijkstra, Eindhoven, Netherlands, assignor to Hartford National Bank and Trust Company, Hartford, Conn., as trustee No Drawing. Application November 23, 1951,
Serial No. 257,941

Claims priority, application Netherlands
December 22, 1950

5 Claims. (Cl. 260—45)

The invention relates to the manufacture of resinlike products by condensation of a suitable phenol, such for example as monohydroxybenzene or alkyl derivatives, of which, more particularly, lower alkyl derivatives, comprising furfural and, if necessary, other aldehyde, such, for example, as formaldehyde.

As is known such phenolaldehyde condensation products are soluble and remain fusible, if per phenol molecule less than 1 mol. aldehyde reacts with the phenol while water is separated out. Such phenolaldehyde condensation products are referred to as Novo-laks and by heating them together with an aldehyde or a substance like furfuramide, hexamethylenetetramine and paraformaldehyde they may be converted into hardened products.

The invention relates to the production of Novo-laks from a phenol, furfural and, if necessary, another aldehyde, for example, formaldehyde and, more particularly, to Novo-laks, in which a large supply of furfural, for example, more than 0.7 mol. per phenol molecule, is combined.

The manufacture of furfural Novo-laks by condensation of furfural with phenol under the action of alkaline substances as a catalyser has been known. For example, ammonia, alkaline- and alkaline-earth hydroxide, alkaline carbonates, tertiary amines, such, for example, as triethylamine, tributylamine, dimethylaniline, and furthermore a methylol compound of melamine has been used for this purpose. However, in this case, the condensation reaction is completed slowly. At a temperature of, for example, 110° C., using sodium-hydroxide, only after ten hours a condensation product is obtained with monohydroxybenzene, in which 0.8 mol. furfural per monohydroxybenzene molecule is combined, while water is separated out. If the condensation reaction is performed at a higher temperature, for example, at 140 to 160° C., it is accomplished more rapidly, but the condensation products then become very viscous, when only a small portion, for example, 0.6 mol furfural per monohydroxybenzene molecule has been combined and at further heating it becomes such a thick liquid that further working entails difficulties. If a mixture of monomethylhydroxybenzene isomerides is condensed using furfural and if, for example, calcium hydroxide is used as a catalyser, only after heating for 8 to 9 hours at 140 to 160° C. a very viscous condensation product is obtained, in which approximately 0.75 mol. furfural per phenol molecule is combined. Other phenols exhibit similar disadvantages in the condensation reaction with furfural.

According to the invention it is possible to manufacture Novo-laks of a phenol using furfural within a considerably shorter time. If, moreover, it is desired to combine a large supply of furfural, for example, 0.9 mol. furfural per phenol molecule, this can be accomplished without entailing the troublesome viscosity of the condensation product referred to above.

Furthermore an excess of furfural is not necessary to complete the condensation reaction, even if it is desired to combine a large supply of, for example, 0.9 mol. furfural per phenol molecule, so that there is no risk of combining an excessive supply of furfural, for example, owing to an excessive duration of heating.

The invention furthermore relates to methods, in which mixtures of furfural and a further aldehyde which is suitable for the production of Novo-laks, for example, formaldehyde, are condensed with the use of a phenol, the total quantity of aldehyde being smaller than 1 mol, per phenol molecule.

According to the invention the aforesaid difficulties are avoided by causing ammonia or a primary amine to react with the phenol and furfural in the presence of a suitable alkaline substance.

The invention more specifically is directed to a method for producing Novo-laks by condensation of a phenol using furfural and, if necessary, a further aldehyde, for example, formaldehyde, under the action of an alkaline catalyst, characterised in that phenol is caused to react with furfural and ammonia or a primary amine, in the presence of a non-volatile inorganic alkaline catalyst.

The term suitable alkaline substance is defined as a substance such as an alkaline or alkaline-earth hydroxide, an alkaline carbonate and furthermore such substances as ensure an adequate alkaline reaction in aqueous solution. Not suitable, however, are ammonia and primary amines, since these substances cannot yield adequate catalytic activity to cause the condensation reaction to be accomplished rapidly and in the desired sense.

It is known that furfural can react with ammonia and primary amines and such a reaction product may be added of a mixture of the reaction components, instead of using ammonia or a primary amine; in this case, the supply of furfural to be added to the reaction mixture must be reduced by a quantity corresponding to this reaction product. Instead of using ammonia or primary amines, use may be made of compounds thereof, which can form ammonia or primary amines under the conditions of the condensation reaction. As such use may, for example, be made of ammonium salts, adding, if necessary, a correspondingly greater supply of catalyser.

A suitable performance of the condensation reaction furthermore requires the presence of a certain supply of water, at least at the beginning of the condensation reaction.

The supply of ammonia of primary amine amounts to, for example, 0.1 to 0.2 mol. per phenol molecule in the reacting mixture. This supply is substantially combined. If then the catalyser is added, practically no ammonia or primary amine escapes, even during the heating process.

The most suitable method of carrying out the invention is that in which furfural, phenol and ammonia are mixed in a molecular ratio of 1.1:1:0.15 to 0.2, to which mixture an alkaline reacting substance, for example, calcium hydroxide is added. This mixture is heated to about 120 to 170° C. with a small supply of water for a short time while subjecting the vapour to reflux, the water contained in the mixture and the reaction water produced then being distilled out, the temperature being raised gradually to 160° C. If desired, refluxing may be dispensed with, the removal of water by distillation being started immediately. The water distilled out still contains a slight supply of the phenol and a slightly greater supply of furfural so that a reaction product remains in the reaction vessel containing slightly less than 1 mol. furfural per phenol molecule.

If water no longer escapes, which is largely the case after one and a half hours to two and a half hours, the heating may be stopped. The Nova-lak produced is comparatively thinly liquid, but upon cooling it forms a brittle resin. The quantity of water in the distillation product corresponds with the supply of water added plus the quantity of reaction water, which may be more than 0.9 mol. per phenol molecule in the condensation product, from which it follows that more than 0.9 mol. furfural per phenol molecule is combined.

If it is desired to combine less furfural, the condensation reaction may be interrupted, after a quantity of reaction water has been distilled out, corresponding with the quantity of furfural to be combined. As a matter of course, a small supply of furfural may be added to the reaction mixture, continuing the heating until reaction water no longer escapes. Such a Novo-lak may, furthermore, be further condensed with the use of a further aldehyde, such, for example, as formaldehyde. If desired, such mixed condensation products may, as an alternative, be obtained by first condensing the phenol with the use of formaldehyde, then causing the reaction to be accomplished in accordance with the invention with the use of furfural.

Further suitable methods are described in the examples.

If ammonia is replaced by a primary aliphatic amine substantially the same result is obtained. In general, it is advisable in this case to heat the mixture for a certain time prior to the addition of the catalyser.

If a primary aromatic amine is used, instead of ammonia, a comparatively long heating time is frequently required before adding the catalyser and these amines are furthermore less effective in avoiding viscosity of the reaction product.

Since many catalysers are, to a greater or lesser extent, hygroscopic, their presence in the products using these Novo-laks results in the absorption of a small quantity of moisture, so that they are less suitable for moulding products which have to fulfil requirements with respect to their electrical properties.

For this reason use is preferably made of alkaline-earth hydroxides as a catalyser.

By mixing with fillers, colouring substances and the like and with aldehydes or substances, such as furfuramide, hexamethylenetetramine and paraformaldehyde moulding products are obtained, the properties of which correspond with those of moulding material containing the know phenol-formaldehyde Novo-laks. By known methods objects cam be made thereof by heating under pressure, these objects being distinguished by their high gloss and dark colour from the objects made with the use of the corresponding phenol-formaldehyde Novo-laks.

The invention will be described in greater detail in connection with the following examples:

Example I

In a round flask comprising a stirrer and a cooler, which may act either as a reflux-cooler or as a distillation cooler, a mixture of 1 mol. monohydroxybenzene, 6 gr. of water 1.1 mol furfural and 12 ccms. of a 25% ammonia solution (0.16 mol.) is heated for 45 minutes while refluxing is being effected. Then 4.4 gr. of calcium hydroxide is added, heating being continued while water is being distilled out, the temperature being raised in the course of two hours from 102 to 158° C. Then substantially no water is distilled out, so that the heating process may be stopped. During heating the condensation product remains comparatively thinly liquid. Upon cooling a brittle resin is obtained, in which 0.90 mol. furfural per phenol molecule is combined. If, instead of using calcium hydroxide, use is made of 2.75 gr. of potassium carbonate or 2.4 gr. of magnesiumoxide, a similar resin is obtained within substantially the same time, 0.91 and 0.86 mol. furfural respectively being combined therein. The quantities of combined furfural were calculated from the distilled quantity of reaction water.

If monohydroxybenzene is mixed in the same manner with the furfural, both 12 ccms. of 25% ammonia solution and 4.4 gr. of calcium hydroxide being added, the distillation being started immediately thereafter, a small quantity of ammonia finds its way to the distillation product. However, a duration of the reaction of two hours, a resin is produced, the appearance and properties of which are entirely similar to those of the resin described above, 0.86 mol. furfural per phenol molecule being combined therein.

Example II

In a flask comprisnig a stirrer and a cooler as described under Example 1, 2 mol. monohydroxybenzene and 12 gr. water are mixed with 2⅛ mol. furfural, to which is then added, while stirring, 10.8 grs. of (0.24 mol.) ethylamine in the form of an 11-normal aqueous solution. This mixture is then boiled for one hour while refluxing and then mixed with 8 grs. of calcium hydroxide. Then, while the water is being distilled out, the temperature is slowly raised to 160° C., this temperature being reached after two and one half hours. Then 358 grs. of a brittle resin was obtained. The distillation product contains a quantity of reaction water, which corresponds with the quantity of 0.91 mol. furfural per phenol molecule in the condensation product; it furthermore contains 0.03 mol. phenol and 0.175 mol. furfural. If, instead of using ethylamine, use is made of 0.12 mol. aniline per phenol molecule a long heating without catalyser is required. If this heating is performed while refluxing for say, three hours, at a temperature of 119° C., and if then 4 grs. of calcium hydroxide per phenol molecule is added and then heated, while water is being distilled out, until after two hours the temperature has risen to 160° C., a resin is obtained, which is thickly liquid, it is true, but which is still pliable.

Example III 2 mol. of a mixture of cresols with a content of 50 to 55% of the metaisomeride is heated together with 2⅛ mol. furfural and 24 ccms. of 25% ammonia (0.32 mol.) for 45 minutes while refluxing. Then 4 grs. of sodium hydroxide dissolved in 8 ccms. of water is added and in the course of 1 hour and 45 minutes the temperature is raised to 156° C., while water is distilled out. From the composition of the distillation product it can be calculated that per cresol molecule 0.90 mol. furfural is combined in the resin. The resin is sufficiently liquid and may be readily cast. After cooling this resin is hard and slightly brittle.

While the invention has been described in connection with specific example and applications, other modifications thereof will be apparent to those skilled in this art without departing from the spirit and scope of the invention as defined in the appended claims.

What I claim is:

1. A method of preparing a resin-like product of permanently fusible type as claimed in claim 4 in which the reaction mixture is heated to a temperature of about 120 to 170° C.

2. A method of preparing a resin-like product of the permanently fusible type as claimed in claim 4 in which the phenol is monohydroxybenzene.

3. A method of preparing a resin-like product of the permanently fusible type as claimed in claim 2 in which the alkaline earth hydroxide is calcium hydroxide.

4. A method of preparing a resin-like product of the permanently fusible type which comprises the steps, mixing furfural, a monohydric phenol, and a member selected from the group consisting of ammonia and unsubstituted primary monoamines in a molecular ratio of 1.1:1:0.12 to 0.2; adding to said mixture as a catalyst an alkaline earth hydroxide; and heating said mixture until at least 0.7 mol. of water has been distilled off for each molecule of phenol which has reacted.

5. A method of preparing a resin-like product of the permanently fusible type as claimed in claim 4, in which the furfural, phenol and ammonia are mixed in a molecular ratio of 1.1:1:0.15 to 0.2.

References Cited in the file of this patent

UNITED STATES PATENTS

| | | |
|---|---|---|
| 1,705,495 | Novotny | Mar. 19, 1929 |
| 1,737,121 | Novotny | Nov. 26, 1929 |
| 2,507,199 | Eber | May 9, 1950 |
| 2,566,851 | Novotny | Sept. 4, 1951 |

FOREIGN PATENTS

| | | |
|---|---|---|
| 359,047 | Great Britain | Oct. 19, 1931 |